(12) United States Patent
Wada et al.

(10) Patent No.: US 7,438,612 B2
(45) Date of Patent: Oct. 21, 2008

(54) PROPELLER SHAFT APPARATUS

(75) Inventors: Shinji Wada, Saitama (JP); Tohru Iiizumi, Saitama (JP); Masaki Inoue, Saitama (JP); Yasushi Sugiura, Saitama (JP); Takuya Nishikoji, Saitama (JP)

(73) Assignee: Honda Motor Co., Ltd., Tokyo (JP)

( * ) Notice: Subject to any disclaimer, the term of this patent is extended or adjusted under 35 U.S.C. 154(b) by 116 days.

(21) Appl. No.: 11/339,461

(22) Filed: Jan. 25, 2006

(65) Prior Publication Data

US 2006/0178060 A1    Aug. 10, 2006

(30) Foreign Application Priority Data

Feb. 9, 2005    (JP) .............. 2005-032523

(51) Int. Cl.
   *B63H 21/21* (2006.01)
   *F16C 3/00* (2006.01)

(52) U.S. Cl. ........................... 440/83; 464/180

(58) Field of Classification Search .......... 440/83
   See application file for complete search history.

(56) References Cited

U.S. PATENT DOCUMENTS 2,751,765 A * 6/1956 Rowland et al. ............ 464/180
4,012,923 A * 3/1977 Lundgren .................... 464/90
5,924,531 A   7/1999 Stark et al.
6,190,263 B1  2/2001 Kimoto et al.

FOREIGN PATENT DOCUMENTS

| CN | 2405881 Y | 11/2000 |
|----|-----------|---------|
| JP | 01-148621 | 6/1989 |
| JP | 08-105489 | 4/1996 |
| JP | 2601067   | 9/1999 |

* cited by examiner

*Primary Examiner*—Jesús D Sotelo
(74) *Attorney, Agent, or Firm*—Carrier, Blackman & Associates, P.C.; Joseph P. Carrier; William D. Blackman

(57) ABSTRACT

A paper tube of a propeller tube 12 is made by winding a single faced corrugated fiberboard 16 in which a wavy corrugating medium 16b is fixed to one side of a flat linerboard 16a so that the corrugating medium 16b is oriented outwards, and the corrugating medium 16b contacts with an inner surface of the propeller tube 12, so as to enhance a vibration controlling function. When winding the single faced corrugated fiberboard 16, since the single faced corrugated fiberboard 16 cannot be wound in a direction oblique to a direction of ridges of the corrugating medium 16b, there are no fears that the shape of the single faced corrugated fiberboard 16 is collapsed to taper axially, thereby it becomes possible to prevent a reduction in vibration controlling function that would otherwise be caused due to a change in the shape of the paper tube.

8 Claims, 6 Drawing Sheets ized patent application No. P.2005-032523, filed on Feb. 9, 2005, the contents of which is incorporated herein by reference.

PROPELLER SHAFT APPARATUS

The present invention claims foreign priority to Japanese patent application No. P.2005-032523, filed on Feb. 9, 2005, the contents of which is incorporated herein by reference.

BACKGROUND OF THE INVENTION

1. Field of the Invention

The present invention relates to a propeller shaft having a vibration controlling member made up of a paper tube within a propeller tube.

2. Description of the Background Art

In the event that gear meshing noise is transmitted to a propeller shaft which transmits the driving force of an engine of an automobile from a transmission or transfer to driving road wheels, a thin cylindrical propeller tube which makes up a main body portion of the propeller shaft resonates to thereby produce resonant noise when the frequency of the meshing noise coincides with the resonance frequency of the propeller tube.

In order to suppress the resonant noise, in a propeller shaft described, for example, in Japanese Patent Unexamined Publication No. JP-A-1-148621, a vibration controlling function is designed to be obtained by inserting a paper tube made by winding a thick paper into a cylindrical shape into the interior of a propeller tube as a vibration controlling member, so that the paper tube is brought into close contact with an inner surface of the propeller tube by virtue of a restoring force produced in the paper tube by virtue of the elasticity of the thick paper so as to suppress resonance by virtue of the close contacting force. In addition, in a propeller shaft described in Japanese Utility Model Examined Publication No. JP-UM-B-2601067, the vibration controlling function is designed to be enhanced compared with a case where the paper tube comprises a single round or layer of thick paper by making a paper tube by winding a thick paper a plurality of rounds, so that a top layer of thick paper is strongly pressed against an inner surfaced of a propeller tube by virtue of the restoring force of second and third layers of thick paper so as to enhance the close contacting force.

Incidentally, in the aforesaid conventional propeller shafts, since the vibration controlling member which suppresses the resonance of the propeller tube is made up of the paper material whose weight is light, there is provided an advantage that the weight of the propeller shaft is suppressed to a small level. However, since the paper tube made by winding the thick paper into the cylindrical shape is not necessarily formed into a round, when the paper tube so made is inserted into the propeller tube, there is caused a problem that a gap is produced between an inner surface of the propeller tube and an outer surface of the paper tube. In addition, in the paper tube made by winding the thick paper the plurality of rounds, when an inertial force is exerted on the paper tube in an axial direction thereof at the time of abrupt start or stop, there occurs a case where an axial end of the paper tube constituting a start of winding deviates axially from the axial end thereof which constitutes an end of winding. When the deviation occurs, the outside diameter of the paper tube tapers as shown in FIG. 7, whereby there is caused a problem that the paper tube is separated from the inner surface of the propeller tube at the end thereof where the outside diameter is reduced or the weight balance of the propeller tube is lost due to a change in the shape of the paper tube to thereby deteriorate the vibration controlling function.

SUMMARY OF THE INVENTION

The invention was made in view of the situations, and an object thereof is to enhance the vibration controlling function by bringing the paper tube which suppresses the resonance of the propeller tube of the propeller shaft into close contact with the inner surface of the propeller tube.

With a view to attaining the object, according to a first aspect of the invention, there is provided a propeller shaft comprising:

a propeller tube; and a vibration controlling member made up of a paper tube in the propeller tube, wherein the paper tube is made of a single faced corrugated fiberboard in which a corrugating medium is fixed to one side of a linerboard, and the corrugating medium of the single faced corrugated fiberboard is in contact with an inner surface of the propeller tube and the single faced corrugated fiberboard is wound in a tubular shape in a plurality of rounds and wherein the paper tube has a variable inner diameter.

According to a second aspect of the present invention, as set forth in the first aspect of the present invention, it is preferable that the single faced corrugated fiberboard is wound four rounds. It is also possible that the propeller shaft comprises a propeller tube; a vibration controlling member comprising a paper tube, wherein the paper tube comprises two end portions of a single faced corrugated fiberboard with a corrugating medium, wherein the paper tube is wound in multiple layers in the radial direction, wherein the corrugating medium is fixed to one side of a linerboard, wherein the corrugating medium of the single faced corrugated fiberboard is in contact with an inner surface of the propeller tube, wherein one end portion contacts the surface of the propeller tube and the other end portion is disposed radially inward, wherein the longitudinal ends of the fiberboard extend substantially along an entire length of the tube parallel to a longitudinal axis of the tube.

According to a second aspect of the present invention, as set forth in the first aspect of the present invention, it is preferable that the single faced corrugated fiberboard is wound four rounds.

According to a third aspect of the present invention, as set forth in the first aspect of the present invention, it is more preferable that the propeller shaft further comprising:

a front stub shaft connected to a front end of the propeller tube, and having a flange with which a front edge face of the propeller tube abuts; and a rear stub shaft connected to a rear end of the propeller tube, wherein the rear stub shaft just contacts with an inner surface of the propeller tube and does not contact with a rear edge face of the propeller tube.

According to the preferred aspect of the invention, since the paper tube is made of the single faced corrugated fiberboard in which the corrugating medium is fixed to the one side of the linerboard, and the corrugating medium of the single faced corrugated fiberboard is in contact with the inner surface of the propeller tube, not only is the wavy corrugating medium certainly brought into contact with the inner surface of the propeller tube but also the close contacting force of the paper tube to the inner surface of the propeller tube is increased by virtue of a restoring load produced in the corrugating medium, thereby making it possible to enhance the vibration controlling function of the propeller tube. In addition, since a thin paper material can be used for the linerboard and the corrugating medium of the single faced corrugated fiberboard, the weight of the paper tube can be reduced compared with a case where the paper tube is made using a thick paper in order to obtain the same magnitude of close contacting force. Moreover, since the single faced corrugated fiberboard cannot be wound in a direction oblique to a direction in which ridges of the corrugating medium extend, there occurs no case where an axial end of the wound single faced corrugated fiberboard accommodated in the interior of the propeller tube which constitutes a start of winding deviates axially from the axial end thereof which constitutes an end of winding, thereby making it possible to prevent a reduction in vibration controlling function that would otherwise be caused due to a change in the shape of the paper tube.

DETAILED DESCRIPTION OF THE PREFERRED EMBODIMENTS

Hereinafter, a mode for carrying out the invention will be described based on an embodiment of the invention which is illustrated in the accompanying drawings.

Figure 1:
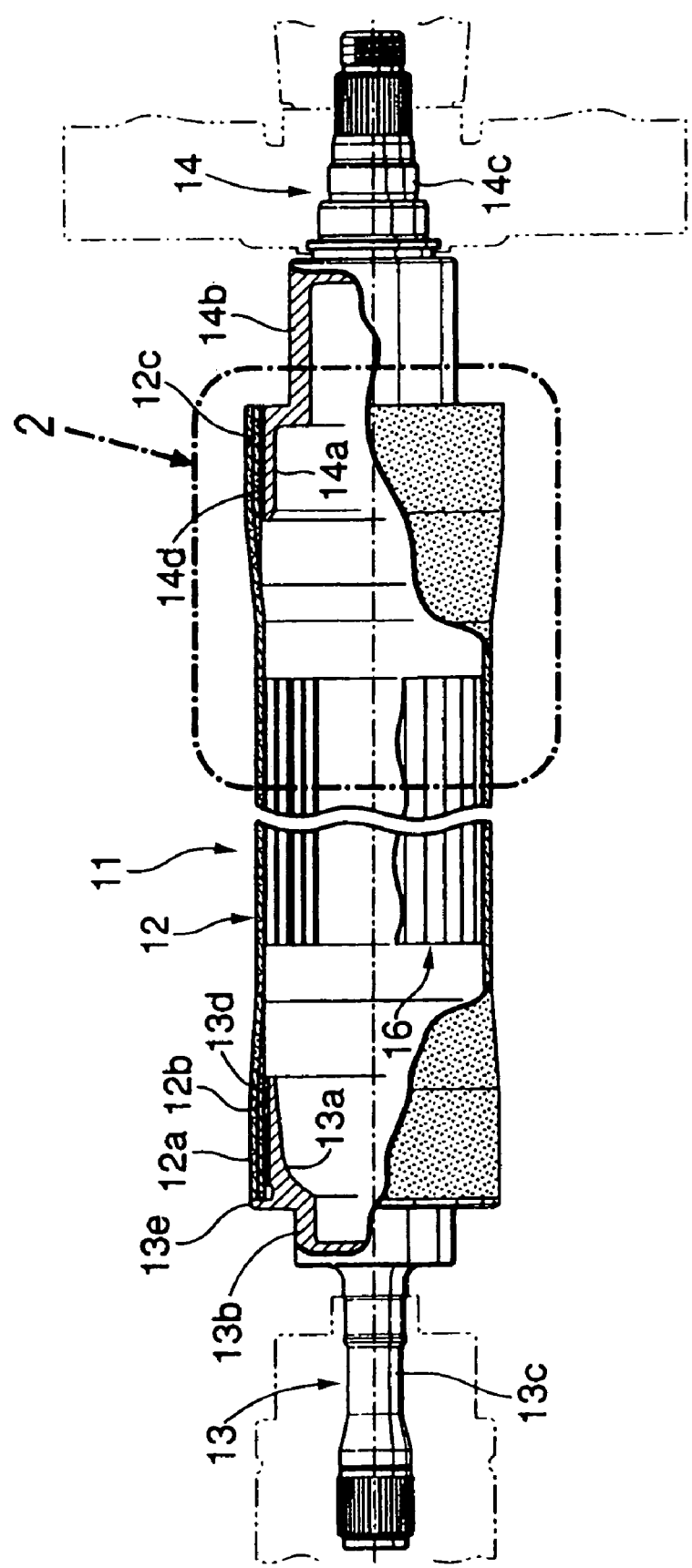
FIG. 1 is a longitudinal sectional view of a propeller shaft.
Figure 2:
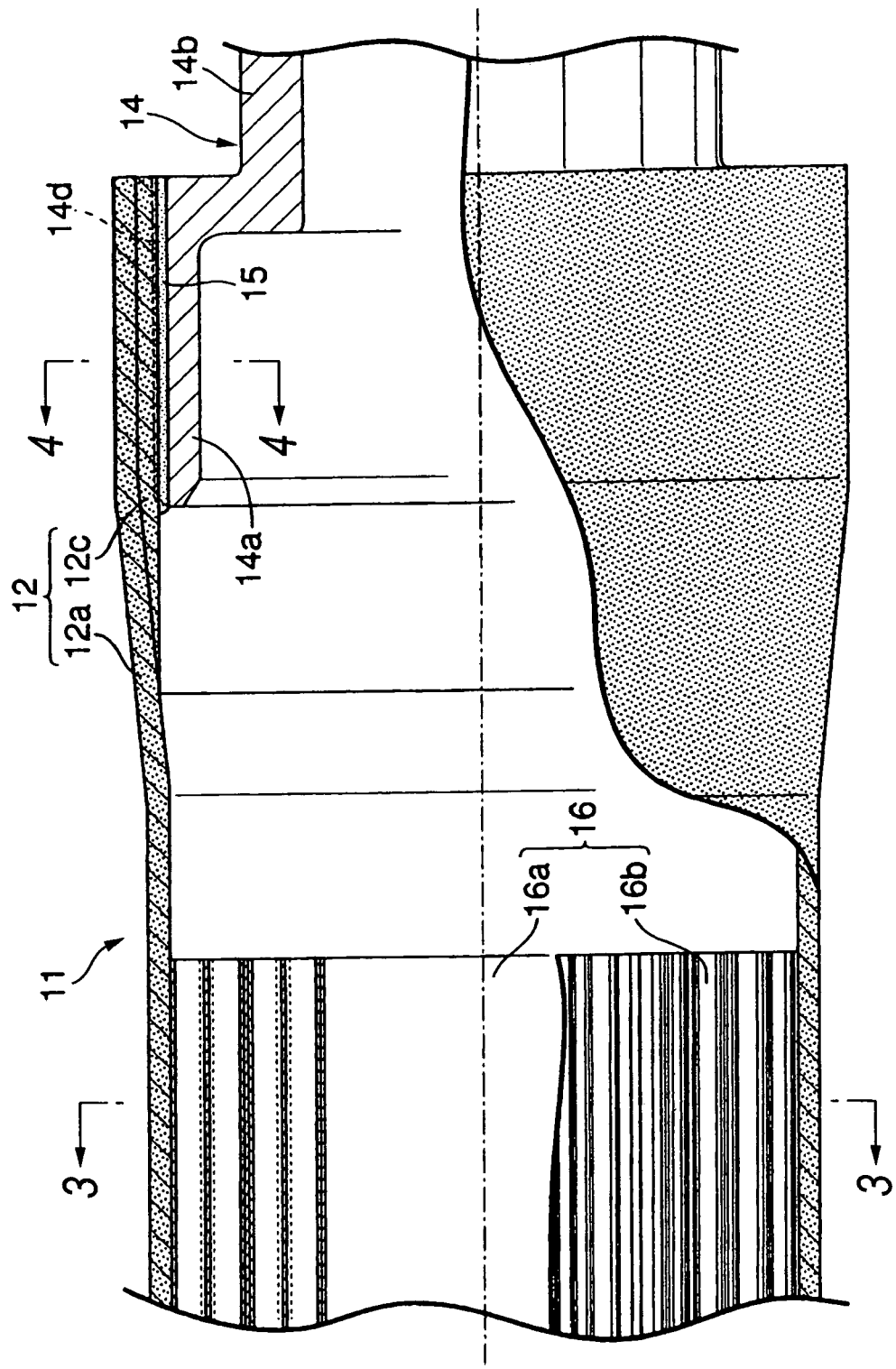
FIG. 2 is an enlarged view of a portion indicated by an arrow 2 in FIG. 1.
Figure 3:
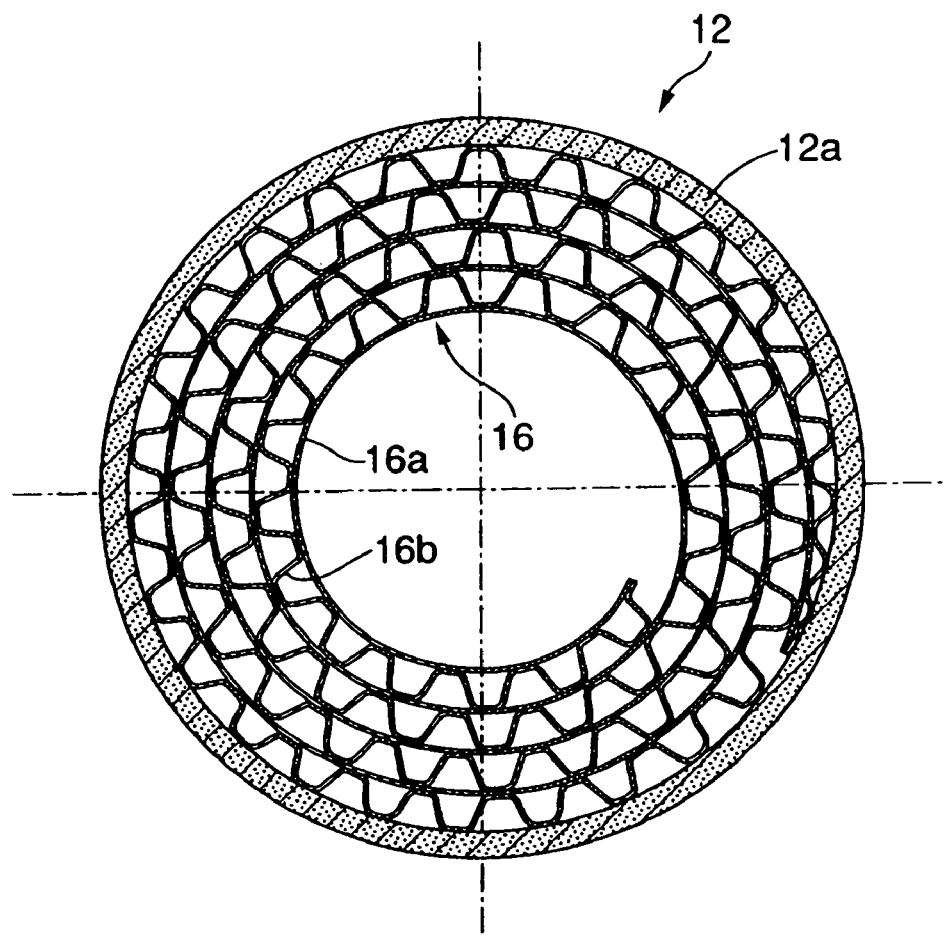
FIG. 3 is a cross-sectional view taken along the line 3-3 in FIG. 2.
Figure 4:
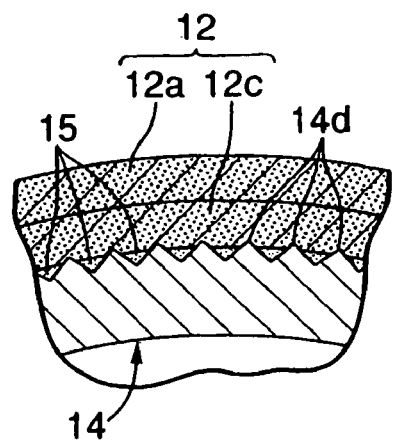
FIG. 4 is a cross-sectional view taken along the line 4-4 in FIG. 2.
Figure 5:
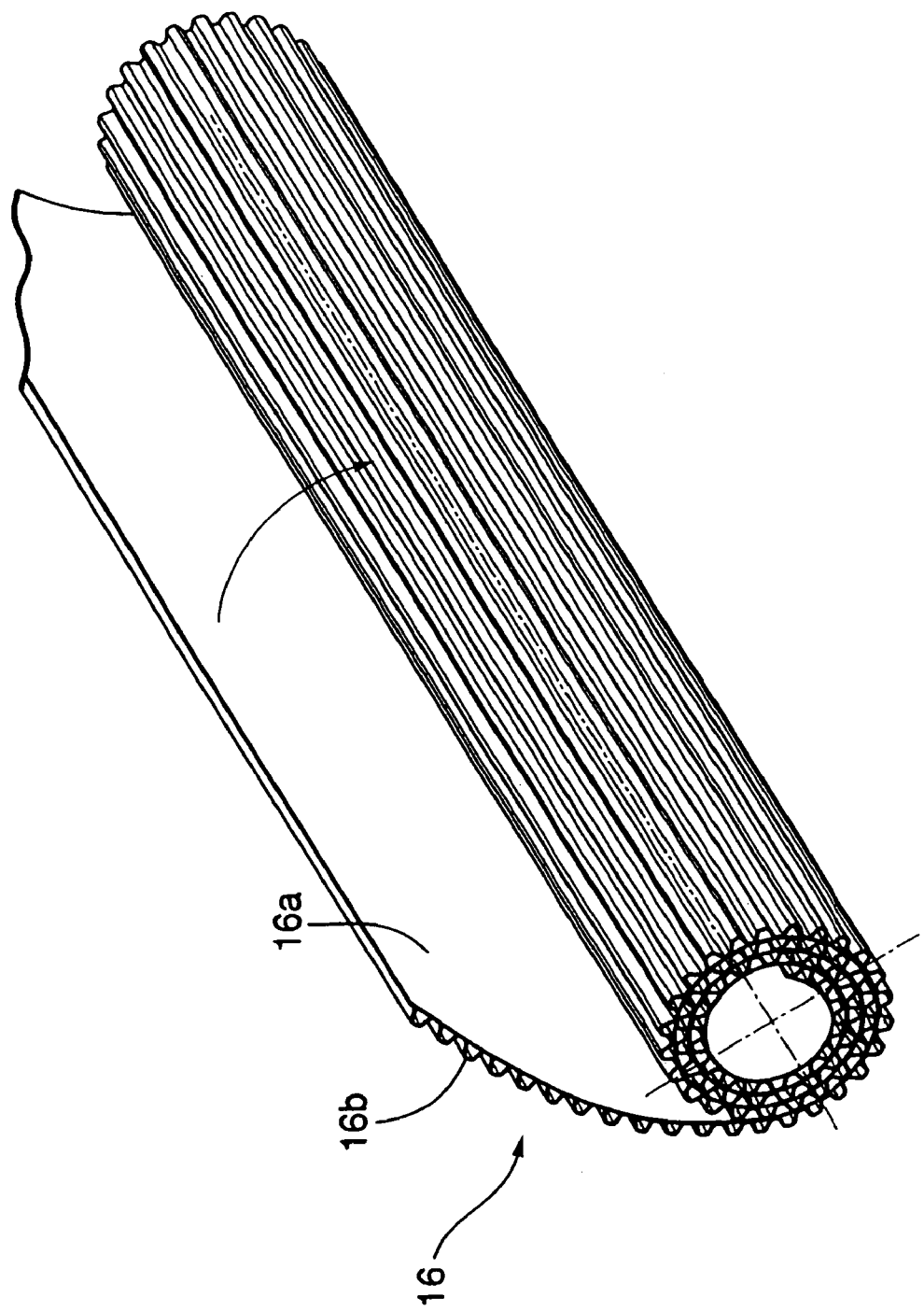
FIG. 5 is a diagram which shows a state in which a single faced corrugated fiberboard is wound.
Figure 6:
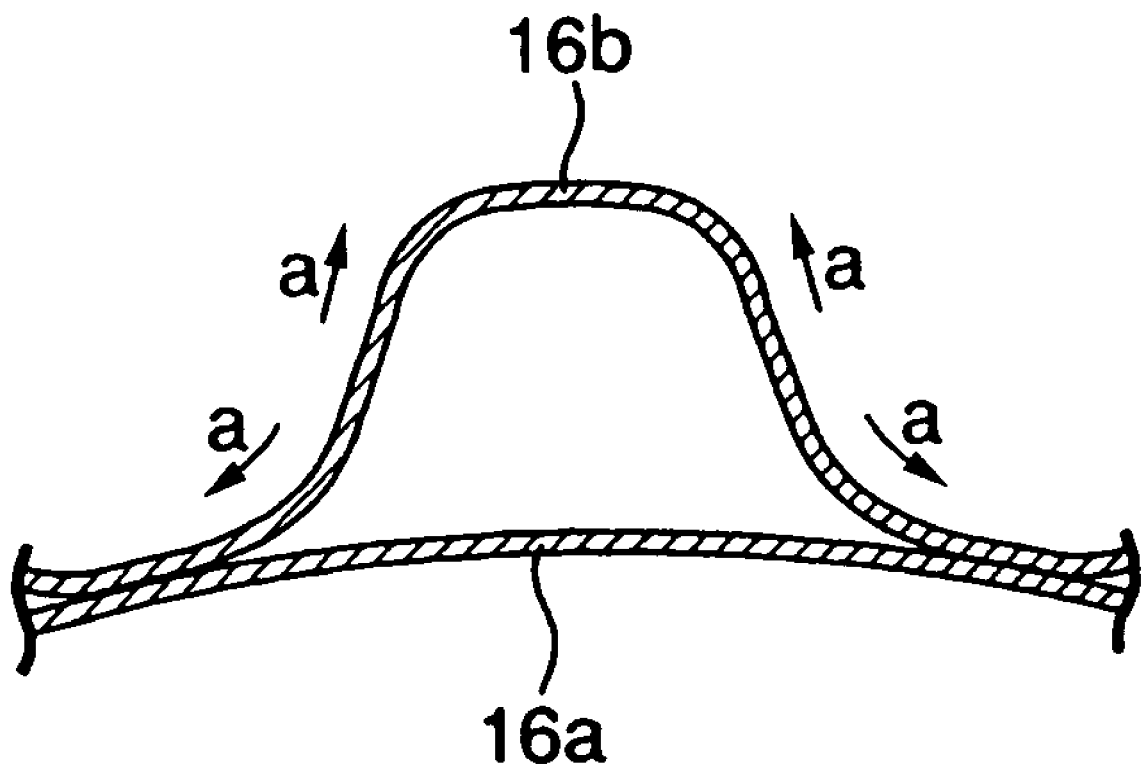
FIG. 6 is a diagram which explains a difference in elastic restoring force depending upon a direction in which the single faced corrugated fiberboard is wound.

FIGS. 1 to 6 show an embodiment of the invention, in which FIG. 1 is a longitudinal sectional view of a propeller shaft, FIG. 2 is an enlarged view of a portion indicated by an arrow 2 in FIG. 1, FIG. 3 is a cross-sectional view taken along the line 3-3 in FIG. 2, FIG. 4 is a cross-sectional view taken along the line 4-4 in FIG. 2, FIG. 5 is a diagram which shows a state in which a single faced corrugated fiberboard is wound, and FIG. 6 is a diagram which explains a difference in elastic restoring force depending upon a direction in which the single faced corrugated fiberboard is wound.

As shown in FIGS. 1 to 4, a propeller shaft 11, which is disposed in a longitudinal direction of a body of an automobile in order to transmit the driving force of an engine installed in a front part of the body from a transmission (or transfer) to rear road wheels, is made up of a propeller tube 12 made of a carbon fiber reinforced plastic, a front stub shaft 13 and a rear stub shaft 14, the front and rear stub shafts 13, 14 being made of metal and connected, respectively, to front and rear ends of the propeller tube 12.

The propeller tube 12 is a member which is formed substantially into a cylindrical shape and includes a long cylindrical main body portion 12a and short cylindrical reinforcement portions 12b, 12c which are laminated on an inner circumference of the main body portion 12a at front and rear ends thereof, and a direction in which carbon fibers are wound in the main body portion 12a is made to intersect a direction in which carbon fibers are wound in the reinforcement portions 12b, 12c in order to increase the strength of the propeller tube 12. The outside diameter of the main body portion 12a at the front and rear ends thereof is increased by such an extent that the reinforcement portions 12b, 12c are provided.

The front stub shaft 13, which is connected to the front end of the propeller tube 12, includes coaxially a cylindrical portion 13a, a stepped portion 13b and a shank portion 13c, and a flange 13e is provided between the cylindrical portion 13a and the stepped portion 13b in such a manner as to protrude therefrom. The rear stub shaft 14, which is connected to the rear end of the propeller tube 12, includes coaxially a cylindrical portion 14a, a stepped portion 14b and a shank portion 14c, but no protruding flange is provided between the cylindrical portion 14a and the stepped portion 14b. Serrations 13d . . . and 14d . . . are worked, respectively, around outer circumferences of the cylindrical portions 13a, 14a of the front stub shaft 13 and the rear stub shaft 14, and these serrations 13d . . . and 14d . . . are pressed, respectively, into the reinforcement portions 12b, 12c of the propeller tube 12 via an adhesive 15, whereby the front stub shaft 13 and the rear stub shaft 14 are connected to the propeller tube 12 in such a manner as to enable the transmission of torque. In this state, the front end of the propeller tube 12 is brought into abutment with a rear surface of the flange 13e of the front stub shaft 13.

In other words, the propeller shaft apparatus is provided with a front stub shaft connected to a front end of the propeller tube, and having a flange with which a front edge face of the propeller tube abuts; and a rear stub shaft connected to a rear end of the propeller tube, wherein the rear stub shaft just contacts with an inner surface of the propeller tube and does not contact with a rear edge face of the propeller tube.

As is clear when referring to FIG. 5 in addition to FIGS. 1 to 4, a single faced corrugated fiberboard 16 is accommodated in the interior of the propeller tube 12 of the propeller shaft 11 in such a state that the single faced corrugated fiberboard 16 is wound into about four rounds or layers. As is best shown in FIG. 5, the single faced corrugated fiberboard 16 is such that a corrugating medium 16b of a wavy cross section which has a number of ridges thereon is integrally bonded to one side of a flat linerboard 16a and corresponds to what results when one of linerboards of a double faced corrugated fiberboard generally used for container boxes or the like is removed therefrom. The single faced corrugated fiberboard 16 is cut into a rectangular shape in such a manner that oppositely facing two sides thereof become parallel with the direction in which the ridges of the corrugating medium 16b extend. During rolling up or winding of the fiberboard 16, a longitudinal axis of the paper tube made from the corrugated fiberboard defines a generating line, as shown, and the fiberboard 16 is wound into a cylindrical shape in such a manner that the linerboard 16a is situated on a radially inner side while the corrugating medium 16b on a radially outer side, with the ridges of the corrugating medium 16b becoming parallel with the generating line, so as to make up a paper tube as a vibration controlling member, and wherein the longitudinal ends of the fiberboard extend substantially along an entire length of the tube parallel to a longitudinal axis of the tube.

When the single faced corrugated fiberboard 16 which is so wound is accommodated in the interior of the propeller tube 12 of the propeller shaft 11, distal end portions of the ridges of the corrugating medium 16b are certainly brought into close contact with an inner surface of the propeller tube 12 by virtue of its own elastic restoring force that is generated when the single faced corrugated fiberboard 16 attempts to restore its original flat shape to thereby prevent the production of resonant noise effectively. Namely, while the thin cylindrical propeller tube 12 resonates at a specific resonance frequency to thereby produce noise when meshing noise of the transmission or transfer case is transmitted to the propeller shaft 11, in the event that the corrugating medium 16*b* of the single faced corrugated fiberboard 16 is brought into close contact with the inner surface of the propeller tube 12, the resonance can be suppressed to thereby suppress the production of noise.

In particular, by winding the single faced corrugated fiberboard 16 into the cylindrical shape, the elastic restoring force of the paper tube can be enhanced compared with the case where a thick paper is wound into a cylindrical shape, the close contacting force of the paper tube to the inner surface of the propeller tube 12 is increased. This is because, as shown in FIG. 6, when the single faced corrugated fiberboard 16 is wound into the cylindrical shape, the restoring load, with which the single faced corrugated fiberboard 16 restores to its original shape, is produced not only on the linerboard 16*a* but also on the corrugating medium 16*b* which is stretched by a tensile load a.

Figure 7:
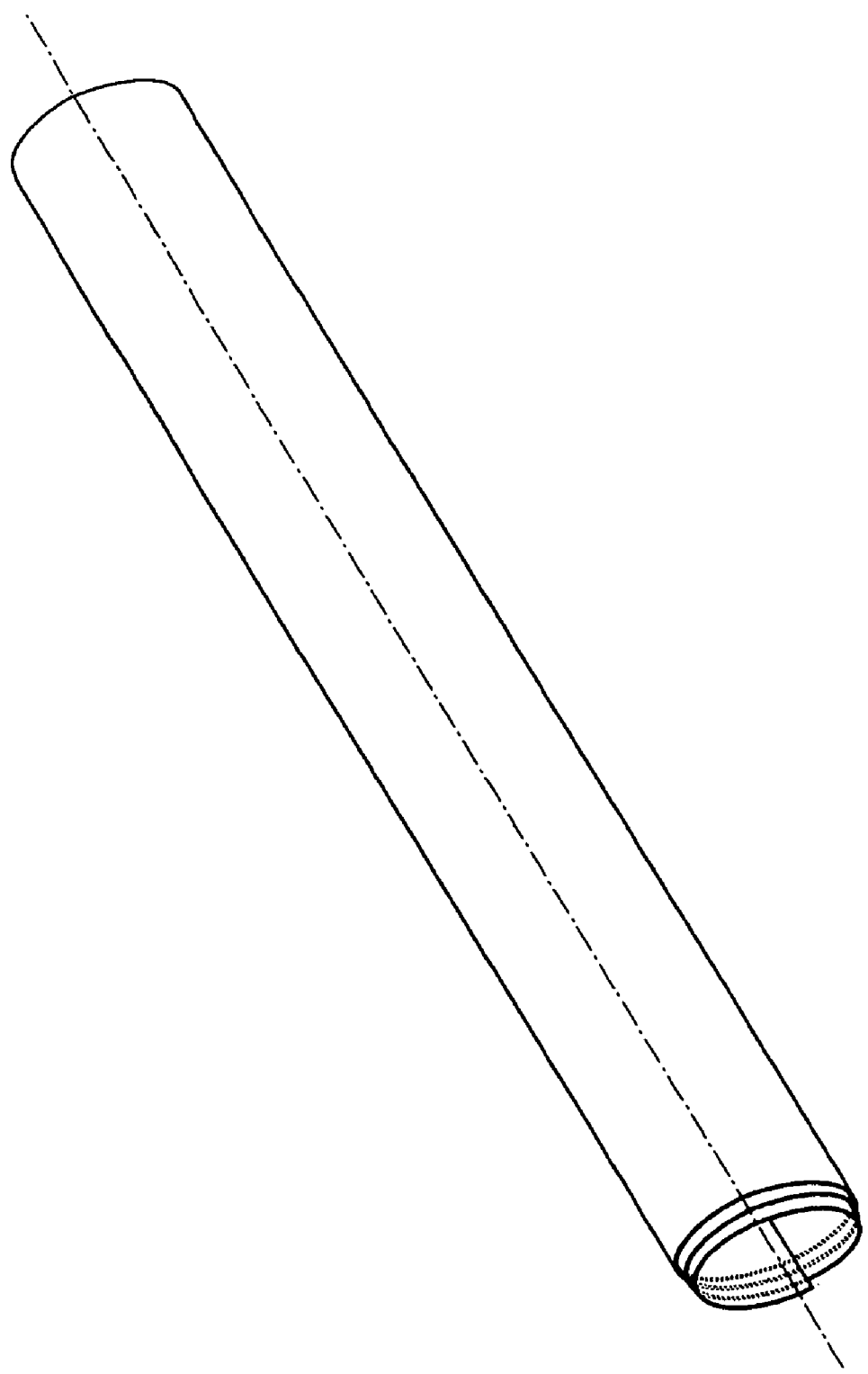
FIG. 7 is a diagram which shows a state in which a wound state of a conventional paper tube is collapsed to taper axially.

In addition, since a thin paper material can be used for the linerboard 16*a* and the corrugating medium 16*b* of the single faced corrugated fiberboard 16, the weight of the single faced corrugated fiberboard can be reduced compared with the case where the paper tube is made using a thick paper in order to obtain the same close contacting properties. Moreover, since, when wound, the single faced corrugated fiberboard 16 cannot be wound in a direction oblique to the direction in which the ridges of the corrugating medium 16*b* extend, the risk of collapsing the winding shape of the paper tube, which is inherent in the conventional example shown in FIG. 7, can be eliminated, thereby making it possible to prevent a reduction in vibration controlling function that would otherwise be produced due to a change in the shape of the paper tube in an ensured fashion.

In addition, when the rear stub shaft 14 is caused to advance towards the front stub shaft 13 by virtue of an impact generated when the vehicle is involved in a rear-end collision, the rear stub shaft 14 having no flange thrusts into the interior of the propeller tube 12 to thereby break the propeller tube 12. As this occurs, since the front end of the propeller tube 12 to which a forward load is applied collides against the flange 13*e* of the front stub shaft 13, whereby the movement thereof is interrupted, the front stub shaft 13 is in no case disconnected from the propeller tube 12. Thus, since the propeller tube 12 fails at the rear portion thereof when the vehicle is involved in a rear-end collision to thereby be suspended downwards from the front stub shaft 13, which functions as a center of the downward swing of the propeller tube 12, there is caused no risk that the propeller tube 12 is caught on the road surface, whereby the vehicle is damaged badly.

Thus, while the embodiment of the invention has been described heretofore, various design changes can be made to the invention without departing from the spirit and scope thereof.

For example, while the single faced corrugated fiberboard 16 is wound four rounds in the embodiment, the number of rounds is not limited thereto but may be arbitrary including one round. However, as the number of rounds of the wound single faced corrugated fiberboard 16 increases, more of the restoring force of the inner layers are transmitted to the outer layer so that the corrugating medium 16*b* is strongly brought into close contact with the inner surface of the propeller tube 12, whereby the production of resonant noise can be prevented more effectively.

In addition, while the propeller tube 12 is made of the carbon fiber reinforced plastic in the embodiment, the invention can provide the same advantage even when applied to a steel propeller tube.

While there has been described in connection with the preferred embodiments of the present invention, it will be obvious to those skilled in the art that various changes and modification may be made therein without departing from the present invention, and it is aimed, therefore, to cover in the appended claim all such changes and modifications as fall within the true spirit and scope of the present invention.

What is claimed is:

1. A propeller shaft comprising:
   a propeller tube; and
   a vibration controlling member made up of a paper tube therein,
   wherein the paper tube is made of a single faced corrugated fiberboard in which a corrugating medium is fixed to one side of a linerboard,
   the corrugating medium of the single faced corrugated fiberboard is in contact with an inner surface of the propeller tube, and
   the single faced corrugated fiberboard is wound in a plurality of rounds.

2. The propeller shaft according to claim 1, wherein a longitudinal axis of the paper tube defines a generating line, and wherein the single faced corrugated fiberboard is wound into a cylindrical shape in such a manner that ridges of the corrugated medium become parallel with the generating line.

3. The propeller shaft according to claim 1, wherein the paper tube is formed from a sheet of the corrugated fiberboard and is wound into a tubular shape wherein the paper tube has a variable inner diameter.

4. The propeller shaft according to claim 1, wherein the longitudinal ends of the fiberboard extend substantially along an entire length of the paper tube parallel to a longitudinal axis of the paper tube.

5. A propeller shaft comprising:
   a propeller tube;
   a vibration controlling member comprising a paper tube disposed inside of the propeller tube; and
   wherein the paper tube is formed by winding a sheet of single faced corrugated fiberboard comprising a linerboard and a corrugating medium into a roll, the sheet of single faced corrugated fiberboard having two opposed end portions;
   wherein the paper tube is wound in multiple layers as viewed in a radial direction;
   wherein the corrugating medium of the single faced corrugated fiberboard is fixed to one side of the linerboard;
   wherein the corrugating medium of the single faced corrugated fiberboard is in contact with an inner surface of the propeller tube; and
   wherein one end portion of said fiberboard contacts an inner surface of the propeller tube, and the other end portion is disposed radially inward of the one end portion.

6. The propeller shaft according to claim 5, wherein the paper tube is formed from a sheet of the corrugated fiberboard and is wound into a tubular shape wherein the paper tube has a variable inner diameter.

7. The propeller shaft according to claim 5, wherein a longitudinal axis of the paper tube defines a generating line, and wherein the single-faced corrugated fiberboard is wound into a cylindrical shape in such a manner that ridges of the corrugated medium become parallel with the generating line.

8. The propeller shaft according to claim 5, wherein the longitudinal ends of the fiberboard extend substantially along an entire length of the paper tube parallel to a longitudinal axis of the paper tube.

* * * * *